(12) United States Patent
Gupta

(10) Patent No.: US 8,192,532 B1
(45) Date of Patent: Jun. 5, 2012

(54) SYSTEMS AND METHODS FOR MAKING A FUEL TANK INERT

(75) Inventor: Alankar Gupta, Normandy Park, WA (US)

(73) Assignee: The Boeing Company, Chicago, IL (US)

(*) Notice: Subject to any disclaimer, the term of this patent is extended or adjusted under 35 U.S.C. 154(b) by 338 days.

(21) Appl. No.: 12/579,021

(22) Filed: Oct. 14, 2009

Related U.S. Application Data

(63) Continuation-in-part of application No. 12/261,880, filed on Oct. 30, 2008, now Pat. No. 7,918,358.

(51) Int. Cl.
*B65D 90/22* (2006.01)

(52) U.S. Cl. .......... 95/288; 244/129.2; 62/48.2

(58) Field of Classification Search .......... 96/108, 96/417, 420, 421; 95/288; 220/88.3; 244/129.2; 62/48.1, 48.2
See application file for complete search history.

(56) References Cited

U.S. PATENT DOCUMENTS

| | | | |
|---|---|---|---|
| 4,378,920 A | | 4/1983 | Runnels et al. |
| 5,415,196 A | * | 5/1995 | Bryant et al. ............ 137/14 |
| 6,136,267 A | | 10/2000 | Bergman |
| 6,343,465 B1 | | 2/2002 | Martinov |
| 6,820,659 B2 | | 11/2004 | Sauer |
| 7,007,893 B2 | | 3/2006 | Loss et al. |
| 7,152,635 B2 | | 12/2006 | Moravec et al. |
| 7,191,983 B2 | | 3/2007 | Loss et al. |
| 7,204,868 B2 | | 4/2007 | Snow, Jr. |
| 7,306,646 B2 | | 12/2007 | Wong |
| 2008/0099618 A1 | | 5/2008 | Zaki et al. |
| 2008/0187785 A1 | | 8/2008 | Kwok |

OTHER PUBLICATIONS

U.S. Appl. No. 12/372,989, filed Feb. 18, 2009.

* cited by examiner

*Primary Examiner* — Robert A Hopkins
(74) *Attorney, Agent, or Firm* — Armstrong Teasedale LLP

(57) ABSTRACT

A fuel tank safety system includes a heat exchanger in flow communication with a cabin conditioning system, a blower configured to withdraw a quantity of ullage gas from a vehicle fuel tank for routing through the heat exchanger, and conduit interconnecting the fuel tank, the blower, and the heat exchanger. The heat exchanger is configured to reduce a temperature of the ullage gas using cooling providing by the cabin conditioning system and thus reduce the fuel content (or fuel-air ratio) of the ullage below threshold required for combustion.

22 Claims, 14 Drawing Sheets

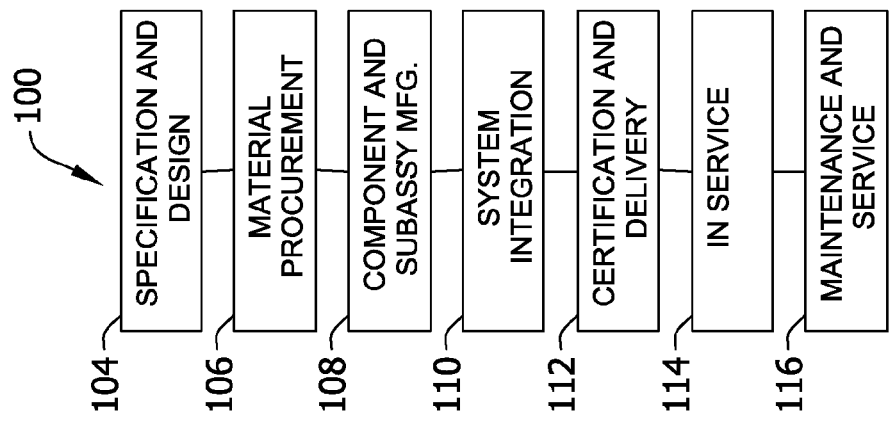

ON-System is enabled
OFF (hidden) - System is disabled
NON-INERT - Ullage non-inert
FAIL (illuminated) - System failure

SYSTEMS AND METHODS FOR MAKING A FUEL TANK INERT

CROSS REFERENCE TO RELATED APPLICATIONS

This application is a continuation-in-part application of U.S. application Ser. No. 12/261,880 filed Oct. 30, 2008 now U.S. Pat. No. 7,918,358 and entitled "System and Method to Make a Fuel Tank Inert", the disclosure of which is hereby incorporated herein by reference in its entirety.

BACKGROUND

The field of the disclosure relates generally to fuel systems and, more particularly, to methods and systems for enhancing fuel tank safety.

Some known fuel tanks have a liquid fuel containing region that typically holds fuel and an ullage region that typically contains a mixture of air and evaporated fuel (i.e. fuel vapor) that defines an fuel/air ratio within the ullage. Ignition of the fuel/air mixture within the ullage may occur, in the presence of an ignition source, when the concentration of fuel vapors (i.e. fuel/air ratio) in the ullage lies within a certain range, commonly known as a combustion supporting range, an unsafe region or a non-inert region. More specifically, the lower flammability limit of the ullage is defined as a threshold below which the fuel/air ratio is too lean and will not ignite. Additionally, the upper flammability limit of the ullage is defined as the threshold above which the fuel vapor/air mixture is too rich to ignite. The lower limit represents the minimum fuel vapor/air mixture concentration that will ignite, while the upper limit represents the maximum fuel vapor/air mixture concentration that will support combustion. A combustion supporting region for a fuel/air mixture is defined between the lower limit concentration and the upper limit concentration. The mixture generally is not combustible outside of this region.

Under typical operating conditions, for example temperatures less than 100° F. at sea level, the fuel/air mixture concentration for Jet A fuel lies outside of the non-inert region and therefore is generally not combustible. However, there are a number of known events that may cause the inert fuel/air mixture within the ullage region of the fuel tank to enter the unsafe region. These circumstances may include, for example, a rapid reduction in tank ullage pressure after take off, i.e. when the aircraft reaches a high altitude in a short time when the fuel is still at the temperature that existed at take-off (for example, 98° F.). This may cause the ullage fuel vapor/air mixture concentration to enter the unsafe region at the higher altitude.

Recent Federal Aviation Administration (FAA) Regulations require that new transport aircraft include systems for enhancing the safety of aircraft fuel tanks. One known system for increasing the reliability of aircraft fuel tanks is to utilize an "inerting system" that channels an inert gas, such as nitrogen or nitrogen enriched air (NEA), into the fuel tank to reduce the oxygen concentration therein. NEA may be generated on-board using, for example, high pressure bleed air from an engine compressor or an auxiliary power unit compressor. In either case, the high pressure air flows through equipment that removes contaminants and moisture, and conditions the air to pressures and temperatures required by the air separation modules that separate the air into an oxygen-rich component that is exhausted from the aircraft and an oxygen-depleted or nitrogen enriched component that flows into the fuel tank. Such a system is expensive to install on an aircraft, significantly increases the weight of the vehicle, and also may not be reliable due to its complexity. Inerting systems, in general, vent fuel vapor-laden ullage gases to the outside ambient when supplying oxygen-depleted or inert gas to the fuel tank. Additionally, aircraft descent rate may impact inerting system design, wherein a high descent rate may impact inert gas flow in order to limit or prevent outside air from entering the fuel tank and maintain the inert state of the fuel tank. This may require large quantities of bleed air to be channeled to the on-board inert gas generating system.

Another known system for enhancing the safety of a fuel tank is to maintain the fuel tank at a relatively low temperature that facilitates preventing fuel vaporization and hence formation of fuel vapors in the fuel tank. One known method for doing so involves using an air conditioning system to displace warm air surrounding the fuel tank.

SUMMARY

One aspect is directed to a fuel tank safety system that includes a heat exchanger in flow communication with a cabin conditioning system, a blower configured to withdraw a quantity of ullage gas from a vehicle fuel tank for routing through said heat exchanger, and conduit interconnecting the fuel tank, the blower, and the heat exchanger. The heat exchanger is configured to reduce a temperature of the ullage gas using cooling-air provided by the cabin conditioning system.

Another aspect is directed to a method for making a fuel tank inert that includes channeling cooling air from a cabin conditioning system through a heat exchanger, channeling a quantity of ullage gas from the fuel tank through the heat exchanger to reduce a temperature of the quantity of ullage gas, and returning the quantity of reduced temperature ullage gas back to the fuel tank.

Yet another aspect is directed to a vehicle that includes a vehicle fuel tank, the fuel tank having a fuel region configured to hold a quantity of fuel, and an ullage region configured to hold a quantity of ullage gas, a heat exchanger in flow communication with a cabin conditioning system, a blower configured to withdraw a quantity of ullage gas from the vehicle fuel tank for routing through said heat exchanger, a first conduit interconnecting the fuel tank, the blower, and the heat exchanger, and a second conduit interconnecting the heat exchanger and the cabin conditioning system. The heat exchanger is configured to reduce a temperature of the ullage gas using cooling-air provided by the cabin conditioning system.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 1 is a flow diagram of an exemplary aircraft production and service methodology.

FIG. 2 is a system block diagram of the aircraft shown in FIG. 1.

DETAILED DESCRIPTION

Figure 3:
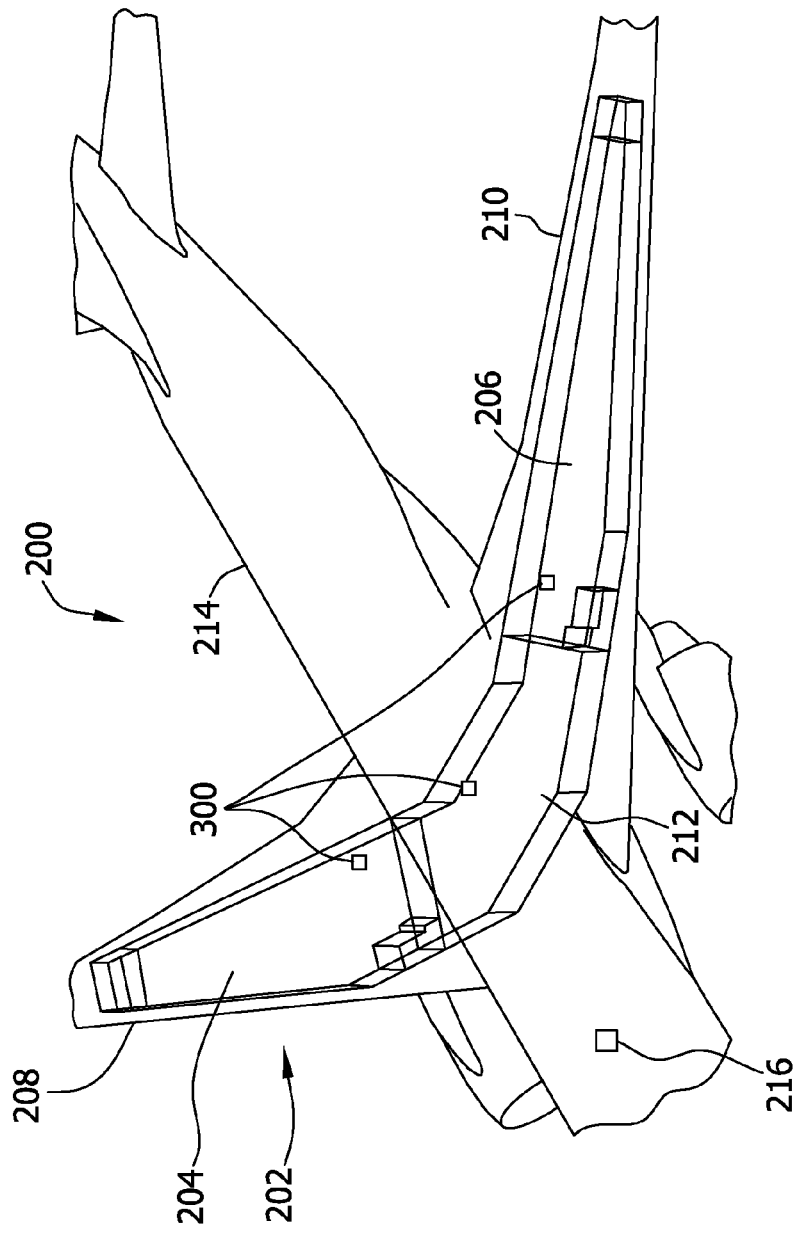
FIG. 3 is an internal perspective view of an exemplary aircraft with an exemplary aircraft fuel system.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

FIG. 3 is an internal perspective view of an aircraft 200 that includes an exemplary aircraft fuel system 202. Aircraft fuel system 202 includes a first fuel tank 204 and a second fuel tank 206 positioned proximate to respective wings 208, 210 of aircraft 200, and a center fuel tank 212 positioned within an aircraft fuselage 214. Alternatively, aircraft 200 may have any fuel tank configuration to allow aircraft 200 to function as described herein. In the exemplary embodiment, first fuel tank 204, second fuel tank 206 and center fuel tank 212 each include an exemplary inerting system 300 for use in maintaining a quantity of fuel and ullage within each fuel tank at a "safe temperature", as described in more detail herein. Alternatively, a single inerting system 300 may be used for all fuel tanks 204, 206, 212 aboard aircraft 200. Aircraft 200 includes a vehicle processor 216 that is programmed with flight data and applicable environmental conditions, such as for example, ambient pressure conditions, as is described in more detail herein.

As provided herein, a "safe temperature" is a temperature at or below which the ullage of the fuel tank in contact with fuel is inert considering all probable operational effects. Safe temperatures may also be temperatures at or below which fuels are incapable of generating non-inert fuel/air ratios. Safe temperatures are generally equal to or less than a fuel lower flammability limit (LFL) temperatures, as described herein. Safe temperatures lower than LFL temperatures may be selected to provide "higher" level of safety, to account for factors such as fuel tank fuel mass loading, fuel sloshing, for fuel composition variability, dissolved oxygen, etc., or any other factor that may influence fuel tank safety.

Figure 4:
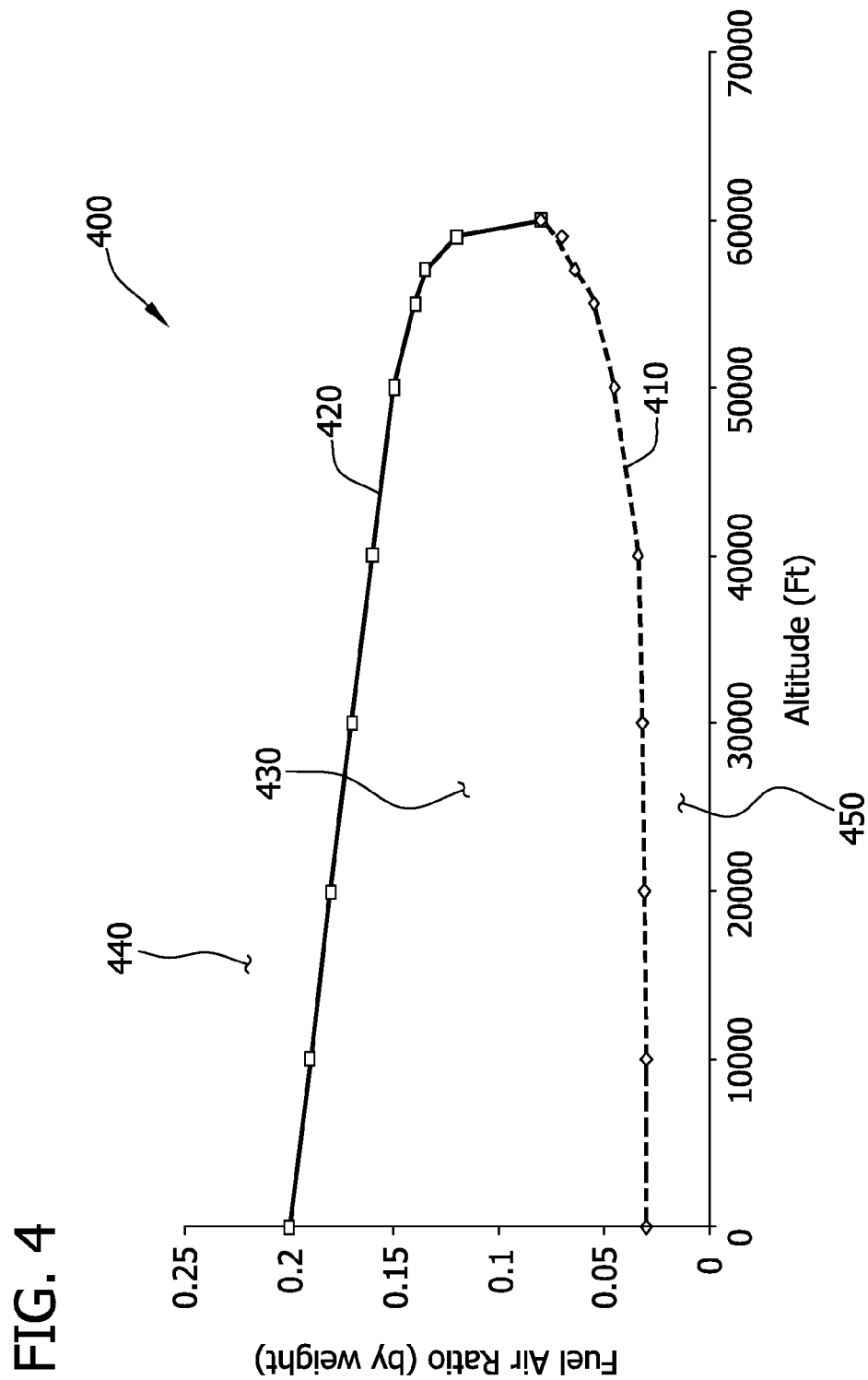
FIG. 4 is a graph illustrating a fuel/air ratio of the non-inert region as a function of altitude for an exemplary fuel used to power the exemplary aircraft shown in FIG. 3.
Figure 5:
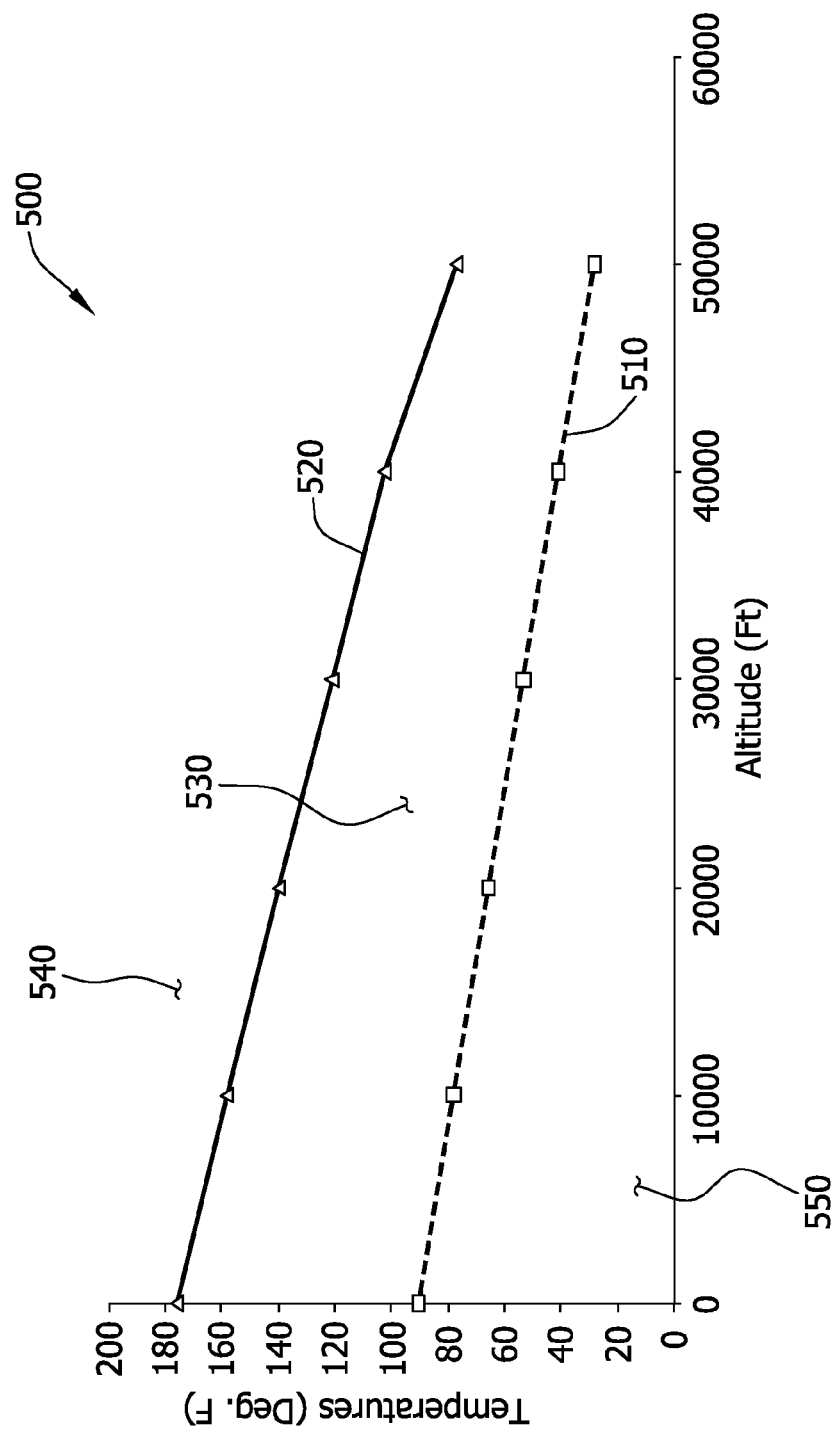
FIG. 5 is a graph illustrating the non-inert region in term so of temperature as a function of the altitude for an exemplary fuel used to power the exemplary aircraft shown in FIG. 3.

FIG. 4 is a graph 400 illustrating a fuel/air ratio of the non-inert region as a function of altitude for an exemplary fuel used to power exemplary aircraft 200 shown in FIG. 3. FIG. 5 is a graph 500 illustrating the non-inert region in terms of fuel temperature as a function of altitude for ullage in thermal equilibrium with liquid fuel in the tank. FIG. 4 shows a lower (or lean) flammability limit (LFL) 410, and an upper (or rich) flammability limit (UFL) 420 for an exemplary fuel tank. In the exemplary embodiment, an ullage gas in thermal equilibrium with liquid fuel is only non-inert within a defined fuel-air ratio region 430. More specifically and as shown in FIG. 4, ullage gas is inert when the fuel-air ratio is greater than the UFL, illustrated in region 440, and when the fuel-air ratio is less than the LFL, illustrated in region 450. Similarly, FIG. 5 shows a lower (or lean) flammability limit (LFL) 510, and an upper (or rich) flammability limit (UFL) 520 for an exemplary fuel tank. In the exemplary embodiment, an ullage gas is non-inert within a defined temperature region 530. More specifically and as shown in FIG. 5, ullage gas is inert when the temperature is greater than the UFL, illustrated in region 540, and when the temperature is less than the LFL, illustrated in region 550.

Figure 6:
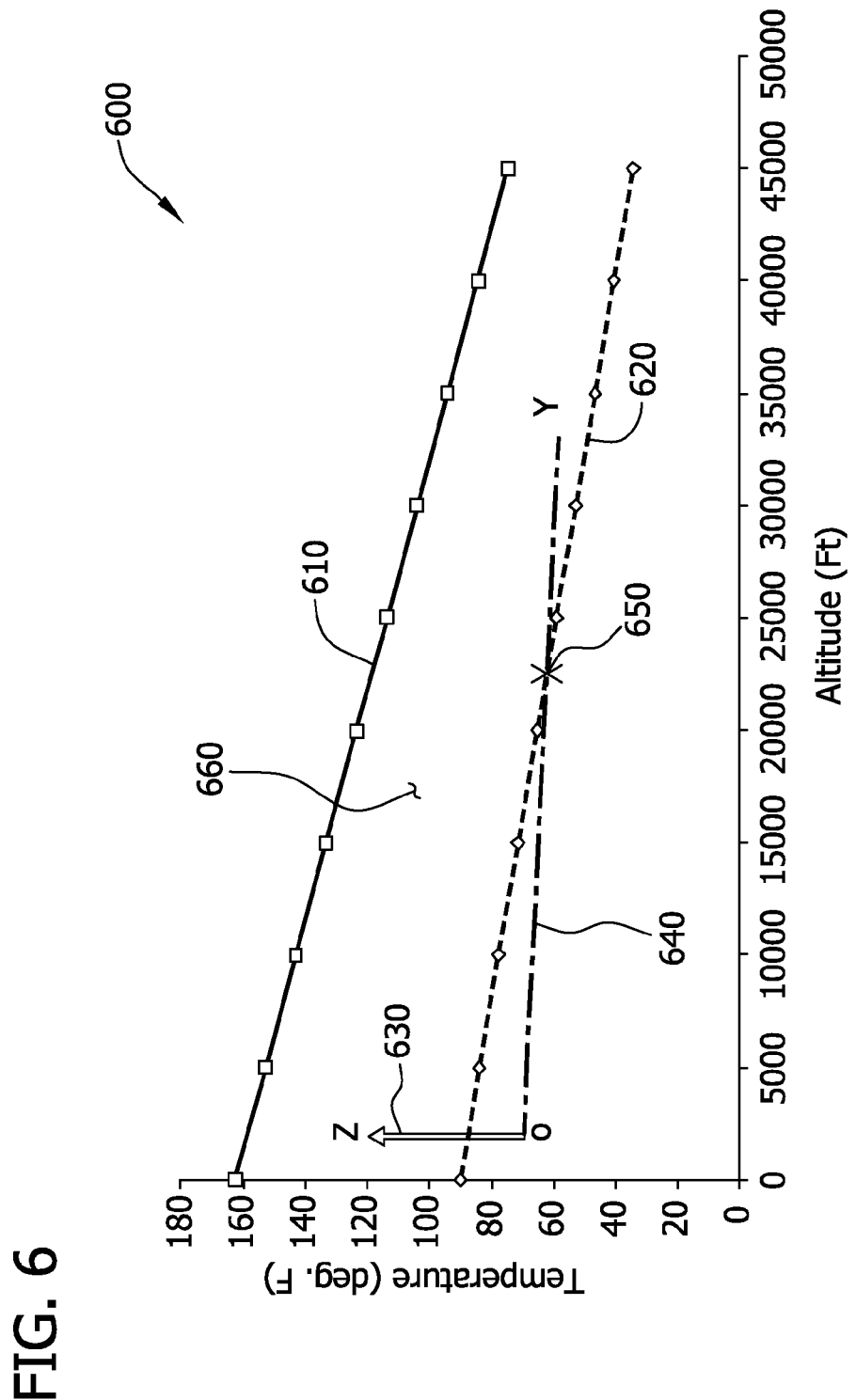
FIG. 6 is a graph illustrating the non-inert region in terms of fuel temperature as a function of the altitude for an exemplary fuel tank inert system used on the exemplary aircraft shown in FIG. 3.

FIG. 6 is a graph 600 illustrating the UFL 610 and LFL 620 for an exemplary fuel. In the exemplary embodiment, there are two circumstances illustrated wherein a fuel tank may become non-inert under operational conditions. In the first instance, the fuel tank may become non-inert during heating of the fuel tank caused by internal or external heat sources 630. The fuel tank ullage is initially inert, at conditions denoted by point O, at a temperature of approximately 70° F., and at an altitude of 2,000 feet (ft) (i.e., field altitude). Fuel may become non-inert under certain conditions, for example, when the fuel tank is heated 630 by internal or external sources (line OZ), such as when the ullage enters the non-inert region 660 region as the fuel/air ratio increases upon heating of the fuel or fuel tank.

Additionally, while the fuel tank that is generally in an inert condition at takeoff, as described herein, fuel tank may become non-inert if the fuel tank is unable to dissipate internal heat as the airplane climbs and as the fuel tank pressure decreases, shown as line 640. The characteristic line 640 crosses the LFL 620 at approximately 23,500 feet 650 and the ullage characteristics falls within the non-inerting region 660. The ullage becomes non-inert, as shown in FIG. 6, because fuel vapor/air mixtures may ignite at high altitudes in the presence of an ignition source. The above processes (heating 630 and/or insufficient heat dissipation during climb 640) by which the ullage becomes non-inert are reversible. That is a fuel tank that is initially non-inert can be rendered inert by cooling and/or by pressurization.

Figure 7:
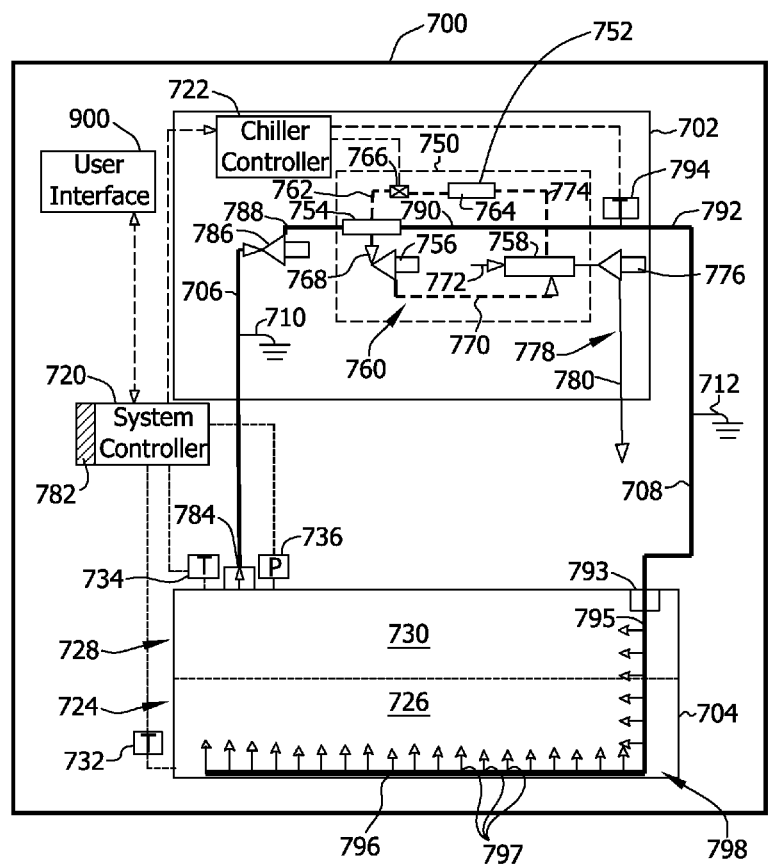
FIG. 7 is a schematic illustration of an exemplary system used to make the exemplary fuel tank inert, such as the fuel tank on the exemplary aircraft shown in FIG. 3.

FIG. 7 is a schematic illustration of an exemplary system 700 used on exemplary aircraft 200 shown in FIG. 3. System 700 is one exemplary embodiment of system 300 shown in FIG. 3. In the exemplary embodiment, system 700 includes a chiller assembly 702 coupled in flow communication with a vehicle fuel tank 704 via an inlet conduit 706 and an outlet conduit 708. Inlet conduit 706 is electrically grounded via a grounding strap 710. Similarly, outlet conduit 708 is electrically grounded via a grounding strap 712. Each ground 710, 712 facilitates preventing a build up of static electricity within system 700. In the exemplary embodiment, system 700 includes a system controller 720 communicatively coupled to chiller assembly 702, and more specifically, to a chiller controller 722 that operates chiller assembly 702, as described in more detail below.

Fuel tank 704 includes a fuel region 724 that contains a quantity of fuel 726, and an ullage region 728 that contains a mixture of fuel and air 730 (referred to herein as "ullage gas"). In the exemplary embodiment, fuel tank 704 includes a fuel temperature sensor 732 communicatively coupled to system controller 720 and positioned within fuel tank 704 to measure a temperature of the fuel 726 and transmit that measurement to system controller 720. Similarly, and in the exemplary embodiment, fuel tank 704 includes an ullage temperature sensor 734 and a fuel tank pressure sensor 736 each communicatively coupled to system controller 720 and positioned to provide a respective temperature and pressure measurement of the ullage region 728 to system controller 720. Alternatively, no fuel tank pressure sensor 736 is included and alternatively an ambient pressure signal is received from a pre-programmed database aboard vehicle processor 216 shown in FIG. 3.

In the exemplary embodiment, chiller assembly 702 includes a chiller unit 750 used to reduce a temperature of a fluid, for example ullage gas 730 and/or fuel 726, extracted from fuel tank 704. In the exemplary embodiment, chiller unit 750 is a conventional refrigerant-based air chiller that includes an accumulator 752, an evaporator 754 (or heat exchanger), a compressor 756, and a heat exchanger 758 (e.g., a condenser). Alternatively, chiller unit 750 may be any device used to reduce the temperature of a fluid and that enables system 700 to function as described herein. More specifically, and in the exemplary embodiment, chiller unit 750 includes a circular, i.e. closed, flow path 760 configured such that accumulator 752 is coupled in flow communication with evaporator 754 via a conduit 762. Evaporator 754 is coupled in flow communication with compressor 756, which is coupled in flow communication with heat exchanger 758. Heat exchanger 758 is coupled in flow communication with accumulator 752.

During use, accumulator 752 is sized and oriented to store a quantity of refrigerant 764 at high pressure. Refrigerant flow through conduit 762 is controlled by a control valve 766 positioned along conduit 762. In the exemplary embodiment, when valve 766 is in an open position, refrigerant is channeled to evaporator 754 via conduit 762 and is used to reduce a temperature of a flow of fluid through evaporator 754. Compressor 756 then receives the flow of heated refrigerant from evaporator 754 via conduit 768. Compressor 756 compresses the refrigerant gas to high pressure and the pressurized refrigerant is then channeled to heat exchanger 758 via a conduit 770 and reduces a temperature of the refrigerant using a flow of cooling air 772 (as described in more detail herein), thereby changing the phase of the refrigerant flow from gaseous refrigerant to liquid refrigerant. Liquid refrigerant is then channeled to accumulator 752 via a conduit 774 for storage and/or reuse.

In the exemplary embodiment, cooling air is channeled through condenser by a cooling air fan 776. The cooling air absorbs heat from the high pressure and temperature refrigerant gas and becomes high temperature condenser exhaust-air 778 which is channeled via conduit 780 for discharge at a convenient location. In the exemplary embodiment, cooling air 772 is recycled air from aircraft cabin (not shown FIG. 7). Alternatively, cooling air 772 may be withdrawn from any convenient location ensuring its withdrawal does not compromise fire detection and suppression performance and does not adversely impact equipment and personnel. In the exemplary embodiment, conduit 780 is oriented to discharge the high temperature condenser exhaust-air 778 within the aircraft fuselage 214 (shown in FIG. 3) at a location that will not adversely impact airplane systems and equipment. Alternatively, exhaust air 778 may be exhausted at any convenient location such that inerting system 700 functions as described herein.

In the exemplary embodiment, system controller 720 includes a processor 782 that is programmed to maintain the ullage gas 730 within the inert regime, as described in more detail herein (see for example FIGS. 4-6). System controller 720 is communicatively coupled to chiller assembly 702 and transmits commands to chiller controller 722 to start and shut down chiller assembly 702 based on various environmental measurements received from sensors 732, 734, 736 positioned within fuel tank 704. More specifically, system controller 720 receives data from fuel tank pressure sensor 736 ($P_{fuel}$), ullage temperature sensor 734 ($T_{ullage}$), and fuel temperature sensor 732 ($T_{fuel}$) and determines a Safe Temperature (ST), Chiller Start Temperature ($T_{start}$), and Chiller Stop Temperature ($T_{stop}$) using fuel tank pressure ($P_{fuel}$), as described in more detail herein.

Figure 8:
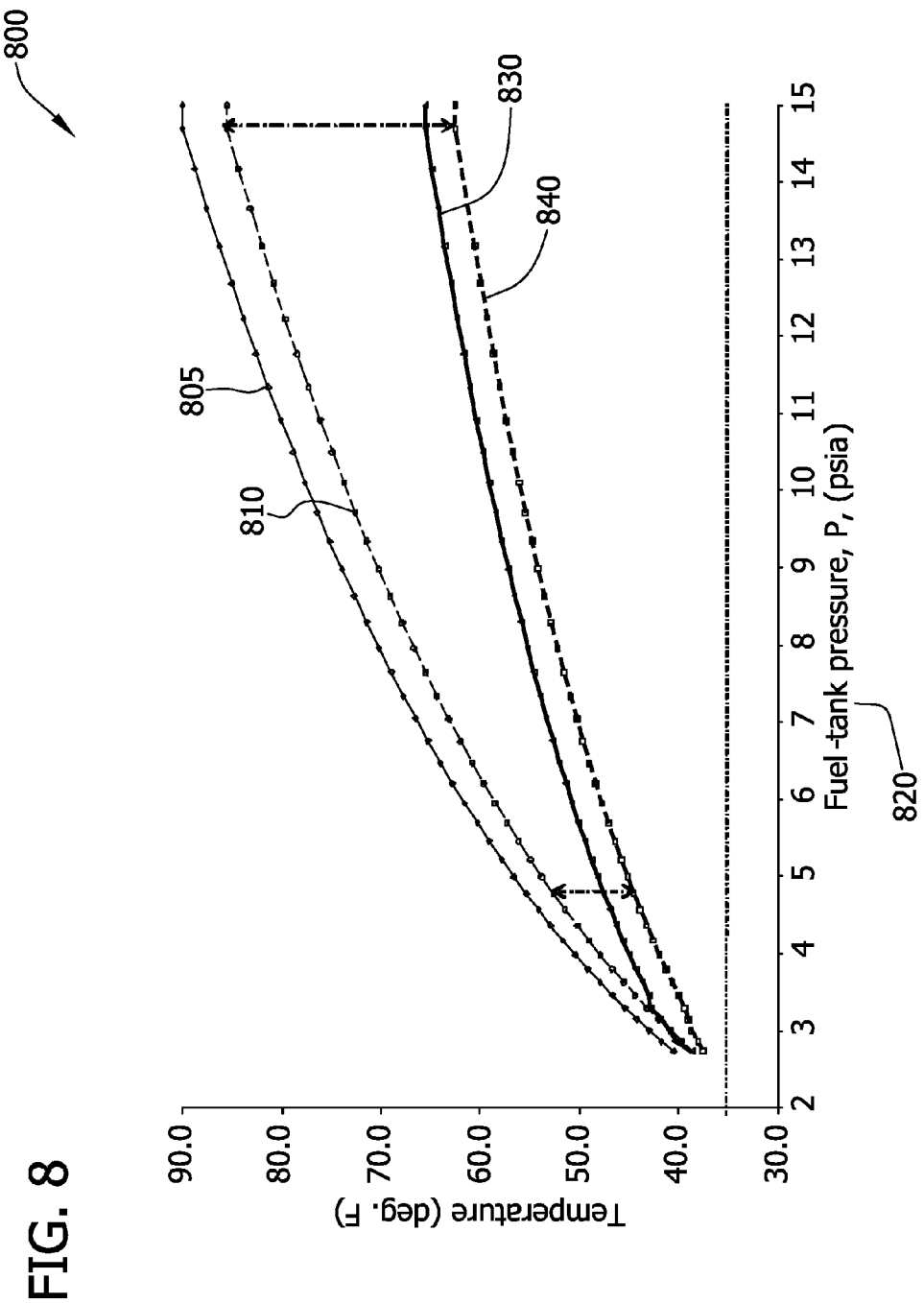
FIG. 8 is a graph illustrating system relevant temperatures as a function of fuel tank pressure for an exemplary fuel.

FIG. 8 is a graph 800 illustrating system relevant temperatures as a function of fuel tank pressure for an exemplary fuel. Graph 800 illustrates safe temperatures 810 for an exemplary fuel as a function of fuel tank pressure ($P_{fuel}$). Graph 800 illustrates the LFL 805 for reference only, to illustrate that safe temperatures have been selected that are lower that LFL 805 to account for operational parameters. In the exemplary embodiment, processor 782 is pre-programmed with safe operating temperatures (ST) 810 for an exemplary fuel. Processor determines ST based upon $P_{fuel}$, as is shown in FIG. 8, and is pre-programmed with a $T_{start}$ 830 and $T_{stop}$ 840 for the chiller assembly 702 (shown in FIG. 7). In the exemplary embodiment, the difference in temperatures $T_{start}$ 830 and $T_{stop}$ 840 represents a dead band and prevents frequent cycling of the chiller assembly 702. Processor compares $T_{ullage}$ with ST to determine whether the fuel tank safety level is within the non-inert region. System controller 720 commands chiller controller 722 to start the chiller assembly 702 when either $T_{ullage}$ or $T_{fuel}$ exceeds $T_{start}$.

More specifically, and in the exemplary embodiment, system controller 720 manages the operation of chiller assembly 702 by comparative analyses of $T_{fuel}$ and $T_{ullage}$ with chiller stop temperature $T_{stop}$ 840 and $T_{start}$ 830 using the following logic. When $T_{ullage}$ is equal to or less than $T_{stop}$ 840 AND $T_{fuel}$ is equal to or less than $T_{stop}$ 840 processor 782 generates a deactivation signal and transmits the signal to chiller controller 722 commanding shut down of chiller assembly 702. As such, chiller assembly 702 is halted when both $T_{fuel}$ AND $T_{ullage}$ are equal to or less than $T_{stop}$. When this condition is satisfied, both $T_{fuel}$ AND $T_{ullage}$ are equal to or less than $T_{stop}$ and also less than ST relative to fuel tank pressure, and therefore the ullage gas is in an inert condition. When $T_{ullage}$ is greater than $T_{start}$ OR $T_{fuel}$ is greater than $T_{start}$, system processor 782 generates a signal and transmits the signal to the chiller controller 722 commanding initiation of the cooling operations. As such, chiller assembly 702 is commanded to operate when either $T_{fuel}$ OR $T_{ullage}$ is greater than $T_{start}$.

Figure 9:
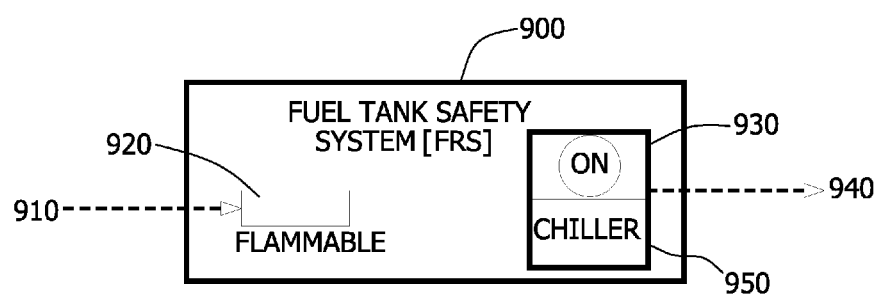
FIG. 9 is a schematic illustration of a user interface used with the system illustrated in FIG. 7.

FIG. 9 is a schematic illustration of a user interface 900 used with the inerting system 700 shown in FIG. 7. In the exemplary embodiment, processor 782 transmits a signal 910 to user interface 900 that is used to notify an operator when the ullage gas 730 is within the non-inert region, as shown in FIGS. 4-6. As described herein, to determine fuel tank inert/non-inert status, processor 782 compares $T_{ullage}$ with ST and generates signal 910 when $T_{ullage}$ is greater than ST. The above condition indicates that the fuel tank may be unsafe based on the pre-determined ST, as shown in FIG. 8. System controller 720 transmits signal 910 to user interface 900. Transmittal of signal 910 stops when $T_{ullage}$ is equal to or less than ST. The above condition indicates that fuel tank 704 is inert based on the pre-determined ST. Indicator 920, if previously illuminated, is extinguished based on an inert ullage (i.e. safe) determination. User interface includes of a manual switch 930 for manually selecting system 700. When switch 930 is in an ON position, a signal 940 is provided to system controller 720. This commands system controller 720 to operate the system and power chiller assembly 702. An advisory indicator 950 illuminates when chiller assembly 702 fails or malfunctions.

The fuel-air ratio of ullage gas 730 progressively decreases and ullage gas 730 progressively become more inert during chiller assembly 702 operations. In the exemplary embodiment, when temperature of ullage gas 730 become equal to or less than the Safe Temperature, ST, the ullage gas 730 within fuel tank 704 becomes non-combustible. The cooling process described herein continues until system controller 720 commands chiller controller 722 to shut down the chiller assembly 702.

Referring again to FIG. 7, during system operations and in the exemplary embodiment, ullage gas 730 is withdrawn from an outlet 784 of the fuel tank 704 by an electric pump 786 and ullage gas 730 is then channeled to chiller assembly 702 via conduit 706. More specifically, pump 786 is coupled in flow communication with evaporator 754 via conduit 788, and pump 786 facilitates channeling ullage gas 730 to chiller assembly 702 via conduits 706, 788. Chiller assembly 702 reduces a temperature of ullage gas 730 as described herein. Alternatively, fuel 726, or a combination of fuel 726 and ullage gas 730, may be withdrawn from fuel tank 704 and subsequently channeled through chiller assembly 702 to reduce a temperature thereof.

Fuel vapors present in ullage gas 730 flowing through the evaporator 754 condense into liquid fuel during the cooling process. The ullage gas 730 then becomes a chilled "wet" ullage mixture 790. In the exemplary embodiment, chilled "wet" ullage mixture 790 containing both liquid fuel and fuel vapors, is channeled back to the fuel tank 704 via conduit 792 and into a fuel tank inlet 793. A temperature sensor 794 continuously monitors the temperature of chilled "wet" ullage mixture 790 that is channeled from evaporator 754. Temperature sensor 794 is communicatively coupled to chiller controller 722 and provides the measured temperatures thereto. Chiller controller commands valve 766 to provide refrigerant 764 to evaporator 754 to maintain a temperature of the "wet" ullage mixture 790 such that temperature sensed by temperature sensor 794 is at the design evaporator discharge temperature $T_{evap}$.

An internal fuel tank conduit 795 is connected to a discharge element 796 that includes plurality of openings 797 for introducing the "wet" ullage mixture 790 into fuel 726. In the exemplary embodiment, internal conduit 795 has multiple openings to discharge some of "wet" ullage mixture into the ullage region 728 and the fuel region 724. The discharged "wet" ullage mixture in the ullage region cools the ullage gas 730. $T_{ullage}$ is reduced by mixing with the returning chilled "wet" ullage mixture 790. In the exemplary embodiment, discharge element 796 is located near a bottom portion 798 of fuel tank 704. The discharged "wet" ullage mixture 790 bubbles through liquid fuel 726 and $T_{fuel}$ is subsequently reduced by the chilled "wet" ullage mixture 790. System 700 uses chiller assembly 702 to remove heat from fuel tank 704 at a rate greater than the rate at which heat enters the fuel tank 704. Alternatively, "wet" ullage mixture 790 may be introduced into fuel tank 704 in any method that enables system 700 to function as described herein.

In an alternate embodiment of system shown in FIG. 7, fuel temperature sensor 732 is deleted. The system controller 720 controls the operation of chiller assembly 702 by comparative analyses of $T_{ullage}$ with $T_{stop}$ 840 and $T_{start}$ 830 using the following logic. When $T_{ullage}$ is equal to or less than $T_{stop}$ 840, processor 782 generates a deactivation signal and transmits the signal to chiller controller 722 commanding shut down of chiller assembly 702. As such, chiller assembly 702 is halted when $T_{ullage}$ is equal to or less than $T_{stop}$. When this condition is satisfied $T_{ullage}$ is equal to or less than $T_{stop}$ and also less than ST relative to fuel tank pressure, and therefore the ullage gas is in an inert condition. When $T_{ullage}$ is greater than $T_{start}$, system processor 782 generates a signal and transmits the signal to the chiller controller 722 commanding initiation of the cooling operations. As such, chiller assembly 702 is commanded to operate when $T_{ullage}$ is greater than $T_{start}$.

In an alternate embodiment of the exemplary embodiment shown in FIG. 7 and the alternate embodiment discussed above internal fuel tank conduit 795 and discharge element 796 are deleted and the "wet" ullage mixture is discharged directly into the ullage region 728. The discharged "wet" ullage mixture cools the ullage gas 730. $T_{ullage}$ is reduced by mixing with the returning chilled "wet" ullage mixture 790. The ullage gas in turn cools liquid fuel 726 and $T_{fuel}$ is subsequently reduced.

Figure 10:
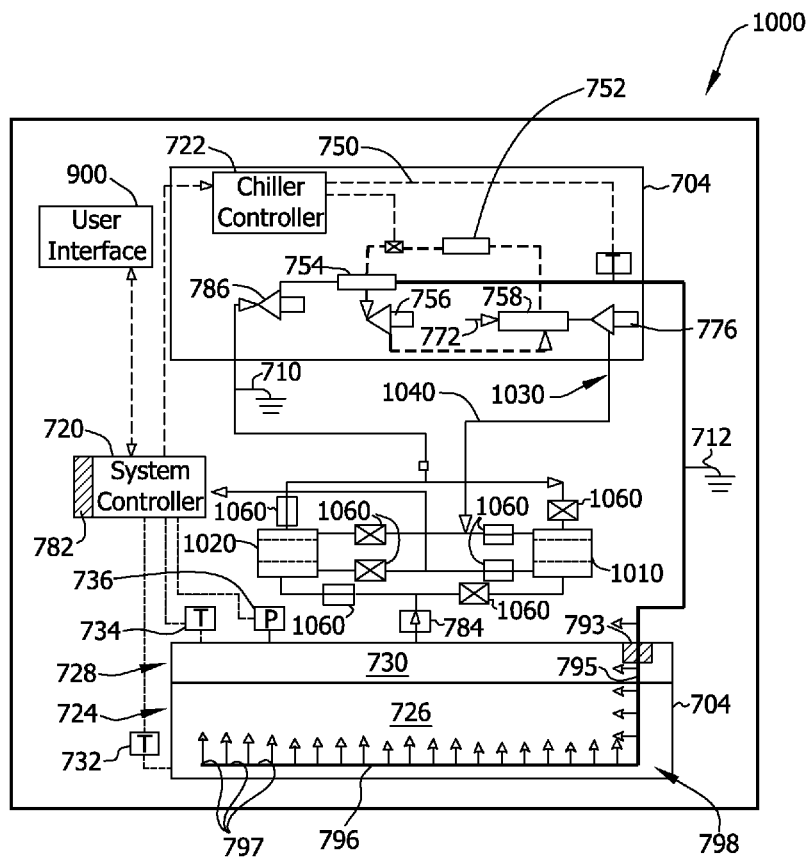
FIG. 10 is a schematic illustration of an alternative system used to make the fuel tank inert.

FIG. 10 is a schematic illustration of an alternative embodiment of a system 1000 used to make a fuel tank inert. The operation of this illustrated embodiment, shown in FIG. 10, is similar to the embodiment shown in FIG. 7 and described herein, and similar to alternative embodiments discussed herein. Therefore, like components are similarly numbered therein. System 1000 is similar to system 700, but may additionally incorporate a plurality of adsorbers 1010, 1020 (e.g., activated charcoal) to remove fuel vapors from the extracted ullage gas 730. FIG. 10 shows adsorber 1020 that adsorbs fuel vapors from the ullage gas flowing to chiller assembly 702. This reduces fuel-air ratio of the ullage gas that is cooled outside the fuel tank. FIG. 10 shows adsorber 1010 bring re-activated by a quantity of hot air 1030 discharged by heat exchanger 758 via conduit 1040. A timer (not shown in FIG. 10), part of system controller 720, periodically switches the operational adsorbers by opening and closing a plurality of valves 1060. During operation, adsorbers minimize fuel vapor content of ullage gas 730 flowing through the chiller assembly (i.e. equipment outside of the fuel tank).

Figure 11:
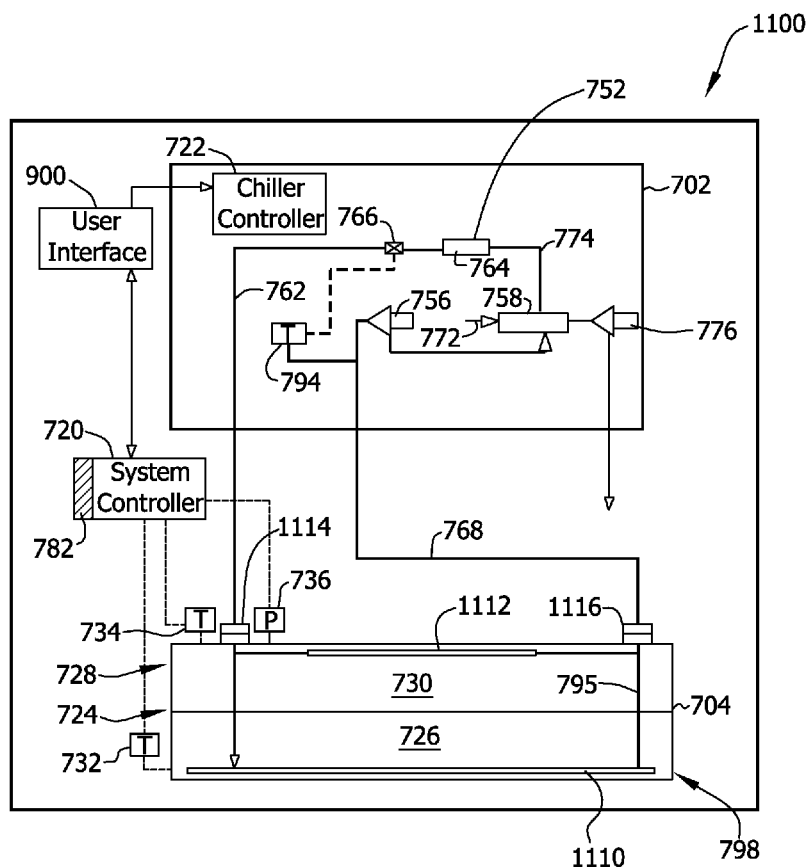
FIG. 11 is a schematic illustration of another alternative fuel tank safety system.

FIG. 11 is a schematic illustration of an alternative embodiment of a system 1100 used to make a fuel tank inert. The operation of this illustrated embodiment, shown in FIG. 11, is similar to the embodiment shown in FIG. 7 and described herein. Therefore, like components are similarly numbered therein. System 1100 is similar to the embodiment illustrated in FIG. 7, but incorporates evaporators 1110, 1112 connected in parallel. Evaporators 1110, 1112 are located respectively at the bottom 798 of the fuel tank 704, and the ullage space 730. In the illustrated embodiment, fuel 726 is directly cooled by evaporator 1110 and the ullage is directly cooled by the evaporator 1112. Temperature sensor 794 is positioned to sense temperature of refrigerant returning to the compressor 756. The sensor 794 modulates valve 766 to control a supply of refrigerant to evaporators 1110 and 1112. Refrigerant is channeled to evaporators via conduit 762 though a substantially leak-proof inlet. Moreover, refrigerant is returned to the chiller assembly 702 via conduit 768, through a substantially leak-proof outlet 1116. The refrigerant is supplied to the evaporators via conduit 762. The refrigerant is returned from the evaporators by conduit 768. Items 1114 and 1116 are disconnects used to connect/disconnect internal conduits from the external conduits.

The following embodiments are related to alternate systems for reducing the flammability of a fuel-tank. The embodiments utilize an existing or essential aircraft system, for example a cabin air-conditioning system, to perform dual functions, in this specific example, condition the airplane and also make the fuel tank inert. One of the benefits to such a system is a reduction in weight as compared to other fuel tank inerting systems, as the amount of additional equipment is reduced. Other benefits include lower recurring costs, lower performance penalty, greater reliability and availability, and initial cost. In embodiments, the disclosed systems can be used in existing airplanes by simple modification of the cabin air-conditioning system such that it performs dual functions. In specific embodiments, cooling packs associated with the aircraft cabin conditioning system are utilized to inert the fuel tank in addition to conditioning the cabin.

There are two types of aircraft cabin conditioning systems: the type that employs refrigerant, and those that employ an air-cycle machine type cooling pack. Both of cabin conditioning system types generate cold air to condition the cabin during warm temperatures. The air utilized is either engine bleed-air or outside air supplied by a dedicated compressor (such as a turbo-compressor or an electric driven compressor. The refrigerant cooling type pack uses a refrigerant to transport heat from the air (engine bleed or compressed air) to the outside air and generally works like a residential air-conditioner.

Alternatively, the air-cycle machine (ACM) cooling type pack uses thermodynamic processes of compression, heat transfer (heat-exchanger) and expansion (in a turbine) to cool the supplied air. Heat is rejected to the outside air. The air cycle type uses either a simple cycle machine or a boot-strap (three wheels and four wheels) machine. Bootstrap systems are generally more efficient, and a four wheel machine system is more efficient than a three wheel system. The operating principle is the same and they all generate cold air by expanding high pressure and moderate temperature air through a turbine. In some ACM type cooling, moisture present in the air is removed prior to expansion in the cooling turbine. Such machines are capable of providing sub-zero temperatures. Embodiments disclosed herein utilize the cold air delivered by the cooling pack (either refrigeration type or the air cycle machine type) of the cabin conditioning system to cool the ullage, condense out fuel vapors, reduce its fuel/air ratio and render the ullage region in the fuel tank lean and therefore inert. As described with respect to the following figures, system components such as a heat exchanger, fan, and valve are components commonly used in commercial and military airplanes. The embodiments are useful for both vented and unvented fuel tanks as fuel vapor laden ullage mixture from the fuel tank is not vented out to the atmosphere.

Figure 12:
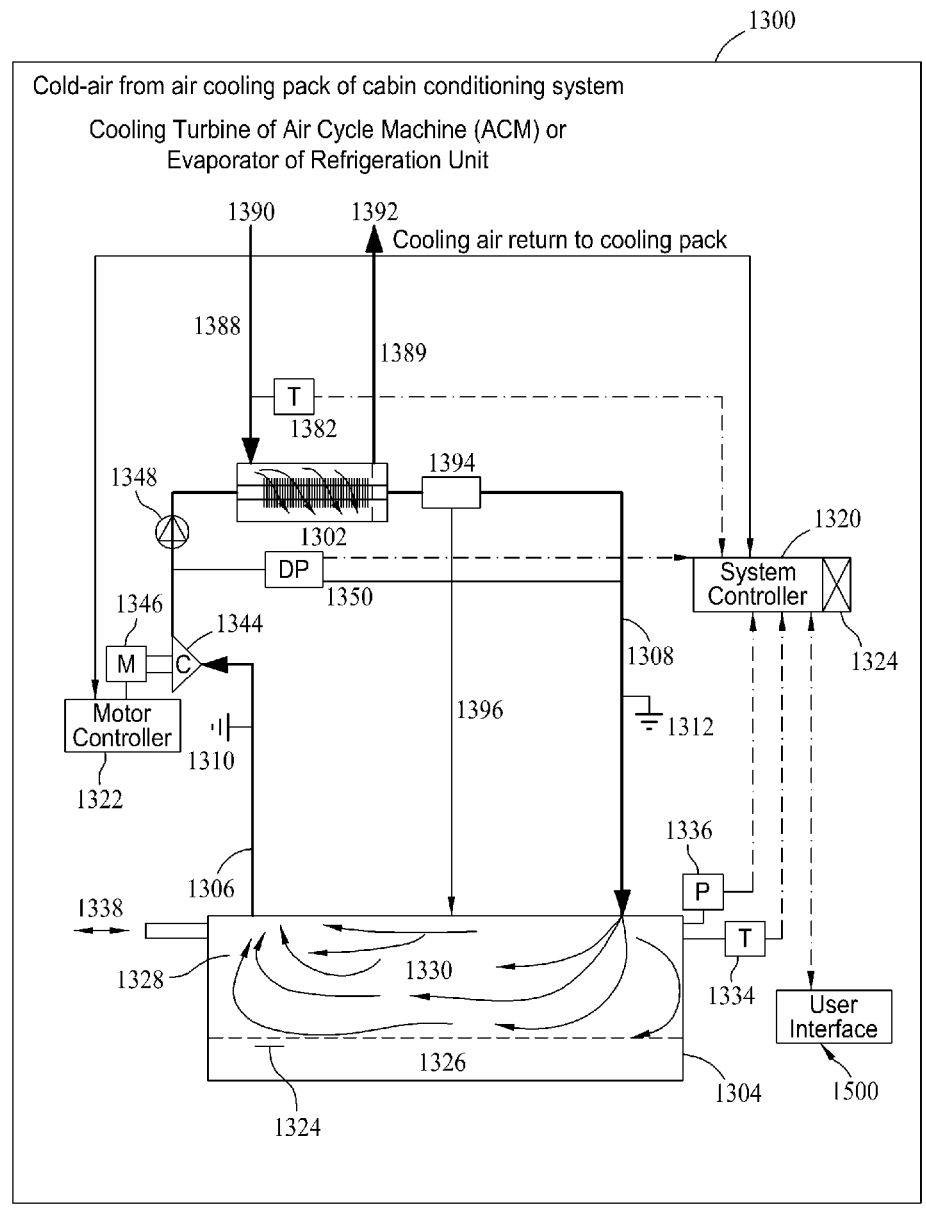
FIG. 12 is a schematic illustration of an integrated fuel tank inerting system which utilizes the cooling capabilities of the cabin conditioning system to inert the fuel tank.

FIG. 12 is a schematic illustration of a system 1300 utilized to make a fuel tank inert. In the illustrated embodiment, system 1300 includes a heat exchanger 1302 coupled in flow communication with a vehicle fuel tank 1304 via an ullage gas suction conduit 1306 and an ullage gas return conduit 1308. Ullage gas suction conduit 1306 is electrically grounded via grounding strap 1310 at one or more locations. Similarly, ullage gas return conduit 1308 is electrically grounded via grounding strap 1312 at one or more location. Grounding straps, similar to 1310 or 1312 are also connected to other system components (not shown) to prevent build up of static electricity. The grounding straps 1310, 1312 connected to the conduits 1306 and 1308 and to other system components (not shown) prevent build up of static electricity within system 1300. In the illustrated embodiment, system 1300 includes a system controller 1320 communicatively coupled to a motor controller 1322 that controls the operation of electric motor 1346 that drives the blower 1344 as described in more detail below.

Fuel tank 1304 includes a fuel region 1324 that contains a quantity of fuel 1326, and an ullage region 1328 that contains a mixture of fuel vapor and air 1330 (referred to herein as "ullage gas 1330"). The fuel region 1324 reduces and the ullage region 1328 increases in volume as the fuel 1326 is used. FIG. 12 shows the fuel tank 1304 as a vented tank, with vent 1338 being the ambient vent through which the fuel tank 1304 can breathe in and breathe out to equalize its internal pressure. While tank 1304 is illustrated as a vented tank, system 1300 is operable with unvented fuel tanks.

In the illustrated embodiment, fuel tank 1304 includes a includes an ullage temperature sensor 1334 and a fuel tank pressure sensor 1336 each communicatively coupled to system controller 1320 and positioned to provide a respective temperature and pressure measurement of the ullage region 1328 to system controller 1320. While FIG. 12 shows a single temperature sensor 1334, multiple temperature sensors may be used depending on fuel tank construction, if deemed necessary. Alternatively, no fuel tank pressure sensor 1336 is included and is replaced by an ambient pressure signal from a database aboard vehicle processor, e.g., aircraft air data system, not shown, if the fuel tank is vented to outside ambient.

In FIG. 12, blower 1344 is driven by an electric motor 1346. Blower 1344 may be of any type suitable for compressing ullage gas through a low pressure ratio. Blower 1344 withdraws ullage gas 1330 from the ullage region 1328 compresses it and delivers the ullage gas to heat exchanger 1302 via check valve 1348. System controller 1320 operates the electric motor 1346 driven blower 1344 and directs the ullage gas 1330 to the heat exchanger 1302 when the ullage gas 1330 temperature, sensed by temperature sensor 1334, is higher than the temperature of cold-air 1390 provided from the cabin conditioning system, as sensed by temperature sensor 1382. In one embodiment, the temperature difference has to exceed a preselected threshold. As such, the ullage gas 1330 flows through the heat exchanger 1302 only when the cold air temperature from the cabin conditioning system is lower than the ullage gas temperature by a defined threshold.

As stated above, the cold air 1390 is delivered to the heat exchanger 1302 by the cooling pack of the cabin conditioning (or air-conditioning) system and returns back to the cabin conditioning system. In one embodiment, the flow of cold-air 1390 through heat exchanger 1302 is continuous. All cold air 1390 from the cooling pack or only a portion of the cold air 1390 from the cooling pack may be directed through the heat exchanger 1302.

Temperature sensor 1382 provides cold air temperature information to the system controller 1320. System controller 1320 is programmed to determine whether to operate the motor driven blower 1344 based on temperature data from the temperature sensors 1334 and 1382. For example, if the ullage temperature ($T_{ullage}$) sensed by temperature sensor 1334 minus the temperature of the air produced by the cabin conditioning system ($T_{cold-air}$) sensed by temperature sensor 1382 is greater than an operating threshold ($X_{operate}$), then the motor 1346 is operated. If the ullage temperature ($T_{ullage}$) sensed by temperature sensor 1334 minus the temperature of the air produced by the cabin conditioning system ($T_{cold-air}$) sensed by temperature sensor 1382 is less than a shut-off threshold ($X_{shut-off}$), then the motor 1346 is shut off.

$X_{operate}$ and $X_{shut-off}$, in one embodiment, are pre-defined thresholds that are programmed within system controller 1320, and the magnitude of threshold $X_{operate}$ is greater than that of $X_{shut-off}$. For example one may select $X_{operate}$ as 10° F. and $X_{shut-off}$ as 5° F. At a cabin conditioning system temperature of 35° F., system controller 1320 will operate the motor driven blower 1344 when the ullage temperature is greater than 45° F. and will shut-off the motor driven blower 1344 when the ullage temperature is equal to or less than 40° F. In this example system 1300 will cool and maintain the ullage region at temperatures in the range of 40-45° F.

Heat exchanger 1302 is a conventional air to air (ullage gas 1330 is essentially air) heat exchanger. In the illustrated embodiment, heat exchanger 1302 is supplied by cold air 1390 by the cooling pack of the cabin air-conditioning system (not shown). The cold-air may be all or part of the cold-air generated by the cooling pack. Cold air 1390 flows from the cooling pack to the heat exchanger 1302 via conduit 1388. The cooling pack may be of any type; a refrigeration type that uses a refrigerant (commonly referred to as vapor cycle type) or an air-cycle machine (ACM) type that generates cold air by the processes of heat exchanger cooling, compression and expansion in a turbine. Cold air 1390, after flowing through the heat exchanger 1302, returns back to the cabin conditioning system via conduit 1389 and is then used for cabin-conditioning. This return air is illustrated in FIG. 12 as return air 1392.

Cold air 1390 is obtained from downstream of the evaporator (not shown) of the vapor cycle type system, not shown. The cold air 1390 operates within heat exchanger 1302 to cool the ullage gas 1330 flowing through the heat exchanger 1302. The cold air 1390, after absorbing heat from the ullage gas 1330 in the heat exchanger 1302, returns back to the cabin air-conditioning system via conduit 1389. This air 1392 is now available for conditioning the airplane cabin (not shown).

In an alternate embodiment of System 1300, cold air 1390 is obtained from downstream of the expansion turbine (also referred as a cooling turbine) of ACM type system. The cold air 1390 from this system operates within heat exchanger 1302 to cool the ullage gas 1330 flowing through the heat exchanger 1302. The cold air 1390, after absorbing heat from the ullage gas 1330 flowing through the heat exchanger 1302, returns back to the cabin air-conditioning system via conduit 1389. This air 1392 is now available for conditioning the airplane cabin.

In one embodiment, ullage gas 1330 flowing through the heat exchanger 1302 is cooled to low temperatures by cold air delivered by the cooling pack. The temperature, as sensed by temperature sensor 1382, of the cold-air depends on the heat load imposed on the cooling pack. In new applications, an integrated cabin conditioning and fuel-tank inerting system would account for a heat load resulting from the ullage gas so there would be no effect on the cabin conditioning portion of the integrated system.

Figure 13:
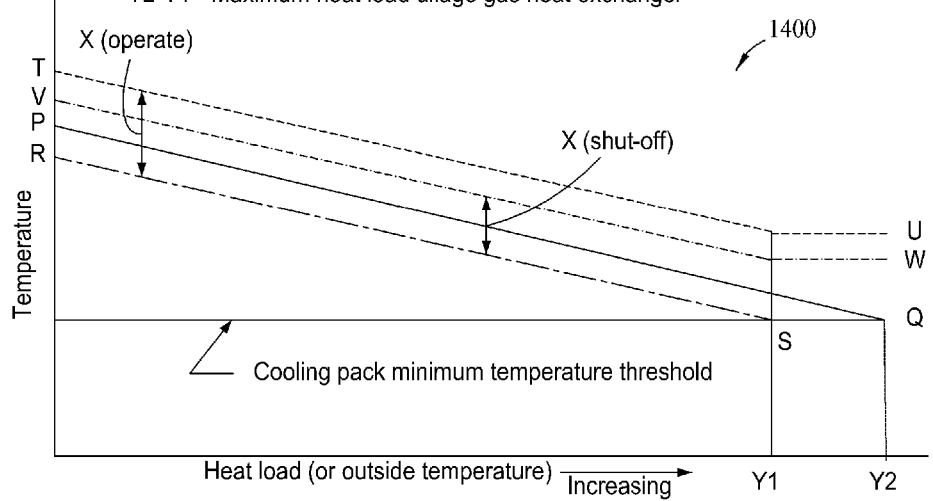
FIG. 13 is a graph illustrating the temperatures as a function conditioning system heat load (or outside ambient temperature) for the system of FIG. 12, the graph includes cooling pack discharge, motor start and motor shut-off.

In addition, the embodiments are also applicable through modification of an existing cabin conditioning system to an integrated cabin conditioning and fuel-tank inerting system. An aircraft cooling pack is designed to provide the coldest air when the outside ambient temperature, humidity, solar heat load, and passenger load are simultaneously at the design limit or the heat load is a maximum, which is denoted by Q in FIG. 13. At other operating conditions the cooling pack operates off-design and provides the cold air at temperatures higher than its capability, as denoted by the see characteristic line PQ in FIG. 13. Adding ullage gas 1330 heat load to the cabin conditioning heat load will cause the cooling pack to generate colder air, to compensate for the additional heat load imposed by the ullage, until the design cold temperature threshold is reached, as shown by characteristic line RSQ.

In graph 1400, Y1 depicts the cabin heat load and (Y2-Y1) depicts the ullage gas heat load. During operating conditions when the cabin conditioning heat load is equal or less than Y1 there will be no impact on the performance of the cabin conditioning system. During heat load conditions when the cabin heat load is greater than Y1 some loss of cabin temperature pull down capability may occur. The value of Y1 is dependent on ullage heat load. As the ullage temperature reduces, the ullage heat load will decrease and the value of Y1 would increase. The result is that system 1300 will be better able to meet cabin cooling requirements. When ullage gas temperature becomes equal to $T_{cold-air}$ plus $X_{shut-off}$, the electric motor driven compressor 1344 stops operating and the ullage gas 1330 will impose zero heat load on the cooling pack. In summary, integration would cause but a small deterioration of cabin conditioning performance, and only for a short duration, while the ullage is being cooled to $T_{cold-air}$ plus $X_{shut-off}$.

Referring again to FIG. 12, since controller 1320 starts the electrical motor 1346 at temperatures dependent on the cold air temperatures sensed by the sensor 1382, the motor 1346 will start at low temperatures on a hot day or days when the cabin heat load is high. The electrical motor 1346 will start at higher temperatures when the heat load is low (cold outside temperature), as shown by the characteristic line TU that is at a fixed design threshold, $X_{operate}$, above the cold air temperature shown by the characteristic line RSQ in FIG. 13.

Also, since the controller 1320 shuts-off the electrical motor 1346 at temperatures dependent on the cold air temperatures sensed by the sensor 1382, the electrical motor 1346 will shutoff at low temperatures on a hot day or days when the cabin heat load is high. The electrical motor will shut-off at higher temperatures when the heat load is low (cold outside temperature), as shown by the characteristic line VW that is at a fixed design threshold, $X_{shut-off}$, above the cold air temperature shown by the characteristic line RSQ in FIG. 13.

The integrated cabin conditioning and fuel-tank inerting system 1300 cools the ullage gas 1330 and maintains it at lower temperatures on a hot day then it does on a cold day. The system will not cool the ullage region 1328 when the ullage temperature sensed by sensor 1334 is equal or less than the sum of cold-air temperature (sensed by sensor 1382) and the design threshold $X_{operate}$.

Commercial aircraft generally have more than one cooling pack within the cabin conditioning system. In embodiments, system 1300 is integrated with each cooling pack. Such a configuration allows all cooling packs to operate similarly, share the ullage gas heat load, and provides redundancy in the event of a failure within one of the cooling packs. In alternate configurations, system 1300 is incorporated with only selected cooling packs of an aircraft.

Federal Aviation Regulations [Code of Federal Aviation Regulations, Title 14, Part 25, Section 25.831(a)] require 'Under normal operating conditions and in the event of a probable failure conditions of any system which would adversely affect the ventilating air, the ventilating system must be designed to provide a sufficient amount of uncontaminated air to enable the crew members to perform their duties without undue discomfort or fatigue and to provide reasonable passenger comfort. For normal operating conditions, the ventilating system must be designed to provide each occupant with an airflow containing at least 0.55 pound of fresh air per minute." This Federal Aviation Regulation ensures adequate supply of cold air for cooling the ullage 1330 gas in the heat exchanger 1302, as shown by Table 1.

TABLE 1

Estimated Ullage cooling available for a fixed cooling air temperature rise for 100-400 passengers airplane

| Certificated Occupant count | Fresh-air Flow Lb/min See Note 1, 3 | Ullage cooling for 0.25° F. temp rise of cold air, BTU/hr; See Note 2 | Ullage cooling for 0.5° F. temp rise of cold air, BTU/hr; See Note 2 | Ullage cooling for 0.75° F. temp rise of cold air, BTU/hr; See Note 2 | Ullage cooling for 1.0° F. temp rise of cold air, BTU/hr; See Note 2 |
|---|---|---|---|---|---|
| 100 | 55.0 | 198 | 396 | 594 | 792 |
| 150 | 82.5 | 297 | 594 | 891 | 1188 |
| 200 | 110.0 | 396 | 792 | 1188 | 1584 |
| 250 | 137.5 | 495 | 990 | 1485 | 1980 |
| 300 | 165 | 594 | 1188 | 1782 | 2376 |
| 350 | 192.5 | 693 | 1386 | 2079 | 2772 |
| 400 | 220 | 792 | 1584 | 2376 | 3168 |

Note
1: Fresh air flow (W) lb/min = Certified occupant count × 0.55
Note
2 Ullage cooling (Q) Btu/hour = W × 60 × 0.24 × temp. rise (° F.)
Note
3: Fresh air flow depends on the certified occupant count and not the actual passenger load.

From Table 1 it is apparent that cooling packs associated with the cabin conditioning systems of commercial aircraft can provide substantial cooling of the ullage gas 1330 without any real adverse effect on cabin conditioning system performance when the cabin heat load is less than the maximum design heat load. In addition, ullage gas cooling is not completely lost when a cooling pack fails or malfunctions. Also, ullage gas cooling is available at all times the cabin conditioning system is operating. As such, an integrated cabin conditioning and fuel-tank inerting system imposes essentially no performance penalty or recurring cost.

Again referring to FIG. 12, some of the fuel vapors present in the ullage gas 1330 flowing through the heat exchanger 1302 will condense out as liquid fuel droplets within the heat exchanger 1302. Low temperature ullage gas with fuel droplets, termed herein as chilled "wet" ullage gas flows from the heat exchanger 1302 to the fuel separator 1394 wherein the condensed fuel is separated. Conduit 1308 delivers the chilled ullage gas 1330 to the ullage region 1328 of fuel tank 1304. Returned chilled ullage gas blows over the exposed surface of fuel 1326 (liquid fuel/ullage interface) and mixes with the ullage gas 1330. Returned chilled ullage gas cools the exposed surface of fuel 1326 and ullage gas 1330. Returned chilled ullage gas becomes an integral part of ullage gas 1330 after mixing with it and is again available for cooling in the heat exchanger 1302. Condensed cold liquid fuel, separated in the fuel separator 1394, is returned back to the fuel tank via conduit 1396 where it mixes with fuel 1326 in tank 1304 and becomes a part of fuel 1326 in the tank. In an alternate configuration, fuel separator 1394 and conduit 1396 are not utilized within system 1300 and "wet" ullage gas is ducted to the fuel tank via conduit 1308.

In one embodiment, system controller 1320 includes a processor 1324 that is programmed to maintain the ullage gas 1330 lean (i.e., at low fuel vapor content or fuel-air ratio) and within the inert region. System controller 1320 is communicatively coupled to motor controller 1322 and transmits commands to motor controller 1322 to start and shut down the electric motor 1346 based on measurements received from sensors 1334 and 1382 positioned within fuel tank 1304 and cold-air conduit 1388 respectively. More specifically, system controller 1320 sends a command to motor controller 1322 to operate the motor 1346 when $T_{ullage}$ (as measured by temperature sensor 1334) minus $T_{cold-air}$ (as measured by temperature sensor 1382) is greater than $X_{operate}$, and deactivates the motor 1346 when $T_{ullage}$ (as measured by temperature sensor 1334) minus $T_{cold-air}$ (as measured by temperature sensor 1382) is equal to or less than $X_{shut-off}$. As described above, $X_{operate}$ and $X_{shut-off}$ are pre-defined thresholds, and $X_{operate}$ is greater than $X_{shut-off}$ in magnitude.

Figure 14:
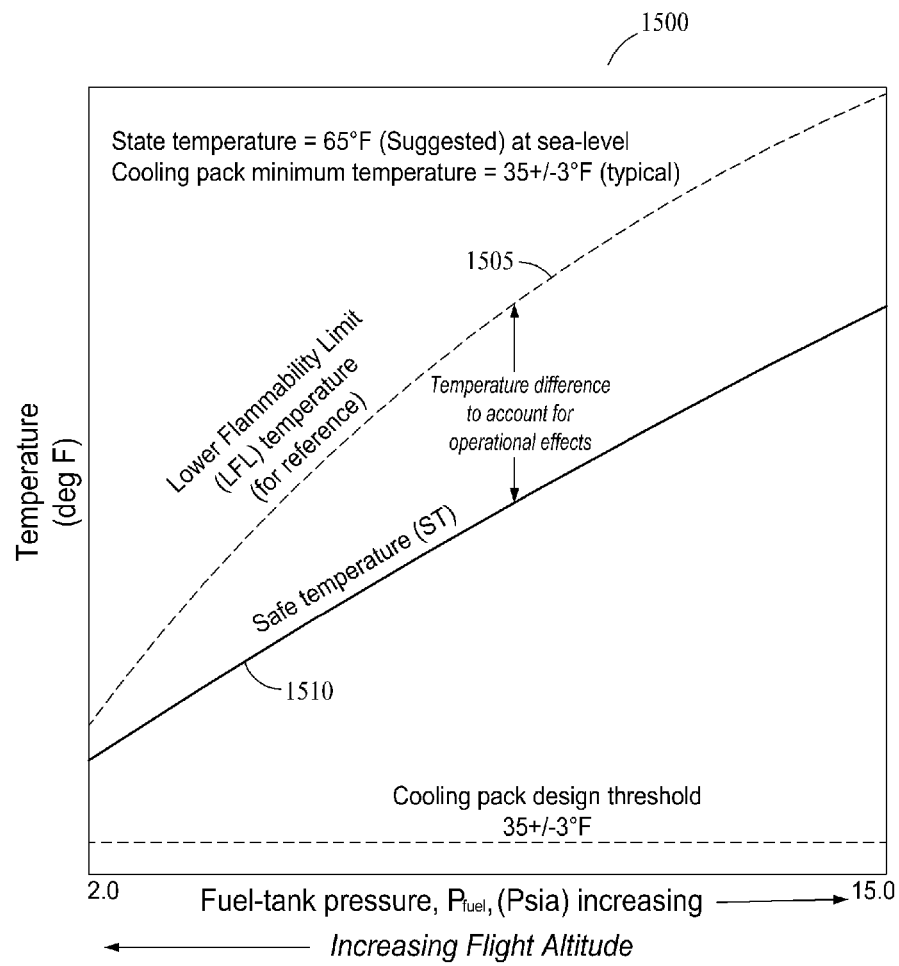
FIG. 14 is a schematic illustration of safe temperature (ST) as a function of fuel tank pressure to determine the inert status of a fuel tank.

In the exemplary embodiment system controller 1320 receives data from fuel tank pressure sensor 1336 ($P_{fuel}$) and continuously determines a safe temperature (ST) using fuel tank pressure ($P_{fuel}$), as described elsewhere herein. FIG. 14 is graph 1500 illustrating safe temperature (ST) as a function of fuel tank pressure $P_{fuel}$. Graph 1500 illustrates the LFL temperatures 1505 for reference only, to illustrate that safe temperatures 1510 have been selected that are lower than LFL temperatures 1505 to account for operational parameters such as fuel sloshing, fuel mass loading variations, fuel age, and fuel composition variations, to name a few. Safe temperatures equal to LFL may be selected without deviating from the embodiments described herein. In the exemplary embodiment, processor 1324 is pre-programmed with safe operating temperatures (ST) 1510 for an exemplary fuel. Processor is programmed to determine ST based upon fuel tank pressure $P_{fuel}$, as is shown in FIG. 14. Processor 1324 compares ullage gas temperature $T_{ullage}$ sensed by sensor 1334 with calculated ST to determine whether the fuel tank ullage gas 1330 is within the non-inert region (i.e., the ullage gas 1330 is at a temperature equal or less than ST (1510).

In an alternate embodiment, the pressure sensor 1336 is replaced by ambient pressure data from the aircraft data system. In another alternate embodiment the pressure sensor 1336 is deleted and the processor 1324 is not pre-programmed with safe temperatures (ST). In this embodiment it is assumed that when the integrated system is operating the fuel tank is inert.

Federal Aviation Administration regulation 25.841 requires that the cabins and compartments to be occupied must be equipped to provide a cabin pressure altitude of not more than 8,000 feet at the maximum operating altitude of the airplane under normal operating conditions. To comply with this requirement cabins and compartments are pressurized and they are at a higher pressure than outside ambient at all conditions except when the airplane is on the ground. The cooling packs provide cold air at a pressure higher than the cabin pressure to account for pressure losses in the downstream components and the air distribution system. This ensures that the cold-air supply pressure in the heat exchanger 1302 is higher than the ullage gas 1330 pressure at all operating conditions and that a mechanical failure (e.g., leak) of the heat-exchanger 1302 would not cause contamination of cooling air flowing to the cabin. The cold air will flow to the fuel tank in the event of failure of the heat exchanger 1302. Failure of heat exchanger 1302 does not pose any cooling air contamination hazard.

Figure 15:
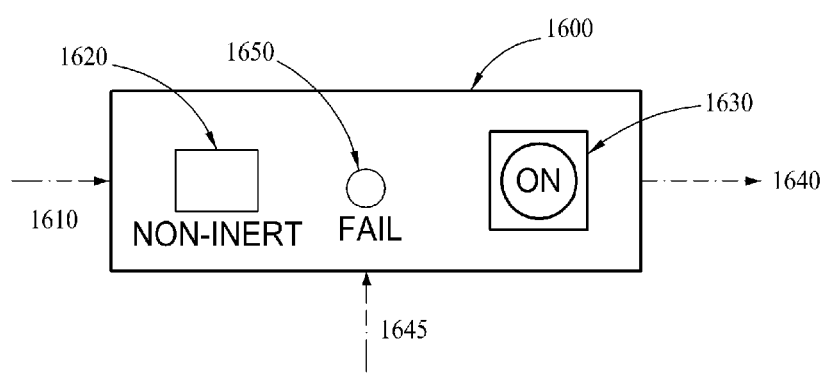
FIG. 15 is one example of a user interface for the system of FIG. 12.

FIG. 15 is a schematic illustration of a user interface 1600 that may be utilized with system 1300 shown in FIG. 12. In the exemplary embodiment, processor 1324 transmits a signal 1610 to user interface 1600 that is used to notify an operator when the ullage gas 1330 is within the non-inert region. As described herein, to determine ullage inert/non-inert status, processor 1324 compares $T_{ullage}$ with ST and generates signal 1610 when $T_{ullage}$ is greater than ST 1510 (refer to FIG. 14). System controller 1320 transmits signal 1610 to user interface 1600. This signal illuminates indicator 1620 that may be used to advise, caution, or warn the operator. The above condition indicates that the ullage is non-inert based on the pre-established criteria of safe temperature. Transmittal of signal 1610 stops when $T_{ullage}$ is equal to or less than ST. The above condition indicates that ullage gas 1330 in ullage region 1328 of fuel tank 1304 is inert based on the pre-established criteria. Indicator 1620, if previously illuminated, extinguishes based on inert ullage (i.e., safe) determination. In an alternate embodiment of user interface 1600, indicator 1620 is not included.

User interface 1600 includes a manual switch 1630 for manually selecting system 1300. When switch 1630 is in an ON position, a signal 1640 is provided to system controller 1320. Signal 1640 commands system controller 1320 to select operation of system 1300. System 1300 operates automatically, without any crew interaction, once selected. An advisory indicator 1650 illuminates when ullage blower 1344 fails or malfunctions or the supply of ullage gas 1330 to the heat exchanger 1302 is below designed threshold.

Referring again to FIG. 12, the failure or malfunction of the blower 1344 is detected by a differential pressure sensor (DP) 1350. The differential pressure sensor 1350 provides signal to the system controller 1320 that compares it with a pre-programmed threshold, XDP. The controller 1320 sends a signal 1645, shown in FIG. 15 to illuminate the advisory indicator 1650 when the differential pressure signal is less than the selected threshold XDP, during periods when the controller has commanded the electric motor controller 1322 to operate the electric motor 1346. The indicator 1650 remains illuminated on detection of failure or malfunction.

Ullage gas 1330 progressively becomes cooler during operation of system 1300. The ullage gas fuel to air ratio decreases and the ullage gas 1330 increasingly becomes inert. In the exemplary embodiment, when temperature of ullage gas 1330 becomes equal to the safe temperature 1510 the ullage gas 1330 is inert or non-combustible or safe. The cooling processes described herein continue until system controller 1320 determines the ullage temperature $T_{ullage}$ (detected by sensor 1334) minus temperature cold air (detected by sensor 1382), is equal to a design threshold $X_{shut-off}$. When this condition is satisfied the system controller 1320 commands motor controller 1322 to shut down the electric motor 1346. When the above condition is satisfied the temperature $T_{ullage}$ of ullage gas 1330 is lower than ST 1510 and the ullage gas is inert or safe. Also, temperature $T_{ullage}$ of ullage gas 1330 is $X_{shut-off}$ degrees above the temperature of cold-air (sensed by sensor 1382) delivered by the cooling pack. When the ullage gas temperature exceeds cold-air temperature by $X_{operate}$ then the system controller 1320 commands the motor controller 1322 to operate the electric motor 1346. System 1300 cools ullage gas 1330. System controller maintains the ullage between $T_{cold-air}$ plus $X_{shut-off}$ and $T_{cold-air}$ plus $X_{operate}$, as shown by characteristic lines TU and VW in FIG. 14.

In various embodiments, during operation of system 1300, ullage gas 1330 becomes a chilled "wet" ullage gas 1392. Chilled "wet" ullage gas 1392 containing both liquid fuel and fuel vapors, flows from the heat exchanger 1302 to the fuel separator 1394 wherein the condensed fuel is separated. Conduit 1308 delivers the chilled ullage gas to the ullage region 1328 of fuel tank 1304. Returned chilled ullage gas blows over the exposed surface of fuel 1326 (liquid fuel/ullage interface) and mixes with the ullage gas 1330. Returned chilled ullage gas cools the exposed surface of fuel 1326 and ullage gas 1330. Returned, chilled ullage gas becomes an integral part of ullage gas 1330 after mixing with it and is again available for cooling in the heat exchanger 1302. Condensed cold liquid fuel, separated in the fuel separator 1394, is returned back to the fuel tank via conduit 1396 where it mixes with fuel 1326 in tank 1304 and becomes a part of fuel in the tank. In an alternate configuration fuel separator 1394 and conduit 1396 are included within system 1300 and "wet" ullage gas is ducted to the fuel tank by conduit 1308.

Exemplary embodiments of fuel tank inerting systems are described in detail above. The above-described systems that are used to make a fuel tank inert reduce ullage fuel vapor content (or fuel-air ratio) by reducing the temperatures of the ullage gas and fuel in the fuel tank. The temperature of the ullage is reduced and maintained below the safe temperature, which is equal to or lower than the fuel's lower flammability limit. This ensures that the ullage is maintained within the inert region as described herein. To reduce flammability, the methods described herein use fuel properties (flash point temperature), lower flammability limit (LFL), a variation of LFL with fuel tank pressure or altitude, a fuel vapor condensation at low temperature, and/or a further reduction of fuel vapor pressure with decrease in fuel temperature.

Moreover, the system and methods described herein overcome many of the deficiencies realized in a nitrogen-based fuel tank inerting type system. In contrast to fuel tank inerting systems, the system size depends only upon the parameters that cause the inerting issues, i.e. heat input, fuel tank heat transfer characteristics and fuel-tank pressure change and does not depend on fuel tank volume as is the case with the inerting systems. Additionally, aircraft descent rate does not impact system design as it may do in an inerting system. For example, during descent, outside ambient air enters a vented fuel tank to re-pressurize the fuel tank. At high altitudes outside air is at temperatures substantially lower than the safe temperature (ST) and may supplement fuel tank cooling. Furthermore, the system and methods described herein require no engine bleed-air as feedstock as is required by an on-board inert gas (nitrogen enriched air) generating system. As such, the system has substantially high efficiency compared to an inerting system. The system requires only electrical power for its operation, and requires no major changes to existing systems and re-certification of existing systems. Therefore, non-recurring costs of the disclosed systems may be substantially lower compared to inerting systems, which require changes to the engine bleed-air system, air-conditioning system ram-air system, and/or duct leak detection system.

Although the foregoing description contains many specifics, these should not be construed as limiting the scope of the present disclosure, but merely as providing illustrations of some of the presently preferred embodiments. Similarly, other embodiments may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications as disclosed herein which fall within the meaning and scope of the claims are to be embraced thereby.

Although the apparatus and methods described herein are described in the context of enhancing safety levels by making ullage regions within aircraft fuel tanks inert, it is understood that the apparatus and methods are not limited to aerospace applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to support the claims, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel tank safety system comprising:
a heat exchanger in flow communication with a cabin conditioning system;
a blower configured to withdraw a quantity of ullage gas from a vehicle fuel tank for routing through said heat exchanger, said blower further configured to compress said withdrawn quantity of ullage gas, said heat exchanger configured to reduce a temperature of the ullage gas using cooling provided by the cabin conditioning system; and
conduit interconnecting the fuel tank, said blower, and said heat exchanger.

2. A fuel tank safety system according to claim 1 further comprising a system controller configured to control operation of said blower.

3. A fuel tank safety system according to claim 1 further comprising:
a system controller;
an electric motor operable to drive said blower; and
a motor controller, said system controller communicatively coupled to said motor controller, said motor controller operable to control operation of said electric motor.

4. A fuel tank safety system according to claim 1 further comprising:
a system controller;
at least one temperature sensor positioned to provide temperature measurements of cold-air from the cabin conditioning system to said system controller; and
at least one temperature sensor positioned to provide temperature measurements of an ullage region of the fuel tank to said system controller, said system controller programmed to operate said blower when the temperature of the ullage region is greater than the temperature of the cold-air from the cabin conditioning system by a defined threshold.

5. A fuel tank safety system according to claim 4 wherein said system controller programmed to shut off said blower when the temperature of the ullage region is less than the temperature of the cold-air from the cabin conditioning system by a defined threshold.

6. A fuel tank safety system according to claim 1 wherein said heat exchanger is in fluid communication with a plurality of cooling pack components associated with the cabin conditioning system.

7. A fuel tank safety system according to claim 1 wherein said conduit and said blower are operative to blow chilled ullage gas over an exposed surface of the fuel within the fuel tank.

8. A fuel tank safety system according to claim 1 further comprising a system controller further comprising a processor, said processor programmed to control operation of said blower such that the ullage gas within the fuel tank is maintained in an inert state.

9. A fuel tank safety system according to claim 1 further comprising:
a system controller;
at least one temperature sensor positioned to provide temperature measurements of an ullage region of the fuel tank to said system controller; and
at least one pressure sensor positioned to provide measurements of pressure within the fuel tank to said system controller, said system controller programmed to determine a desired temperature for the ullage region based on the pressure measurements.

10. A fuel tank safety system according to claim 9 wherein said system controller is programmed to compare an ullage gas temperature received from said at least one temperature sensor with the desired temperature to determine whether ullage gas within the ullage region is within a non-inert range.

11. A fuel tank safety system according to claim 1 further comprising:
a system controller; and
a user interface communicatively coupled to said system controller, said system controller programmed to transmit a signal to said user interface when ullage gas within the ullage region is within a non-inert range.

12. A fuel tank safety system according to claim 1 further comprising:
a system controller; and
a user interface communicatively coupled to said system controller, said user interface comprising a manual switch, operation of said switch configured to cause said system controller to operate said fuel tank safety system.

13. A method for making a fuel tank inert, said method comprising:
   channeling cooling air from a cabin conditioning system through a heat exchanger;
   channeling a quantity of ullage gas from the fuel tank through the heat exchanger to reduce a temperature of the quantity of ullage gas, said channeling a quantity of ullage gas comprises operating a blower to withdraw the quantity of ullage gas from the fuel tank, compressing the withdrawn quantity of ullage gas with the blower, and routing the withdrawn quantity of compressed ullage gas through the heat exchanger; and
   returning the quantity of reduced temperature ullage gas back to the fuel tank.

14. A method according to claim 13 wherein channeling a quantity of ullage gas from the fuel tank through the heat exchanger comprises:
   comparing temperature measurements of cold-air from the cabin conditioning system with temperature measurements of an ullage region of the fuel tank;
   causing a blower channel the quantity of ullage gas when the temperature of the ullage region is greater than the temperature of the cold-air from the cabin conditioning system by a defined threshold; and
   shutting the blower off when the temperature of the ullage region is less than the temperature of the cold-air from the cabin conditioning system by a defined threshold.

15. A method according to claim 13 wherein returning the quantity of reduced temperature ullage gas back to the fuel tank comprises blowing chilled ullage gas over an exposed surface of the fuel within the fuel tank.

16. A method according to claim 13 further comprising determining a desired temperature for the ullage region based on a measured pressure within the ullage region.

17. A vehicle comprising:
   a vehicle fuel tank, the fuel tank comprising a fuel region configured to hold a quantity of fuel, and an ullage region configured to hold a quantity of ullage gas;
   a heat exchanger in flow communication with a cabin conditioning system;
   a blower configured to withdraw a quantity of ullage gas from said vehicle fuel tank for routing through said heat exchanger, said blower further configured to compress said withdrawn quantity of ullage gas, said heat exchanger configured to reduce a temperature of the ullage gas using cooling provided by the cabin conditioning system;
   a first conduit interconnecting said fuel tank, said blower, and said heat exchanger; and
   a second conduit interconnecting said heat exchanger and the cabin conditioning system.

18. A vehicle according to claim 17 further comprising:
   a system controller;
   an electric motor operable to drive said blower; and
   a motor controller, said system controller communicatively coupled to said motor controller, said motor controller operable to control operation of said electric motor.

19. A vehicle according to claim 17 further comprising:
   a system controller;
   at least one temperature sensor positioned to provide temperature measurements of cold-air from the cabin conditioning system to said system controller; and
   at least one temperature sensor positioned to provide temperature measurements of an ullage region of said fuel tank to said system controller, said system controller programmed to operate said blower when the temperature of the ullage region is greater than the temperature of the cold-air from the cabin conditioning system by a defined threshold and shut off said blower when the temperature of the ullage region is less than the temperature of the cold-air from the cabin conditioning system by a defined threshold.

20. A vehicle according to claim 17 wherein said conduit and said blower are operative to blow chilled ullage gas over an exposed surface of the fuel within said fuel tank.

21. A vehicle according to claim 17 further comprising:
   a system controller;
   at least one temperature sensor positioned to provide temperature measurements of an ullage region of said fuel tank to said system controller; and
   at least one pressure sensor positioned to provide measurements of pressure within said fuel tank to said system controller, said system controller programmed to determine a desired temperature for the ullage region based on the pressure measurements and operate said blower to achieve the desired temperature as determined by said at least one temperature sensor.

22. A vehicle according to claim 17 further comprising:
   a system controller; and
   a user interface communicatively coupled to said system controller, said system controller programmed to transmit a signal to said user interface when ullage gas within the ullage region is within a non-inert range, said user interface comprising a manual switch, operation of said switch configured to cause said system controller to control operation of said blower.

* * * * *